US012057745B2

(12) United States Patent
Bott et al.

(10) Patent No.: US 12,057,745 B2
(45) Date of Patent: Aug. 6, 2024

(54) COOLING-OPTIMISED HOUSING OF A MACHINE

(71) Applicant: Siemens Aktiengesellschaft, Munich (DE)

(72) Inventors: Erich Bott, Hollstadt (DE); Reiner Seufert, Salz (DE); Rolf Vollmer, Gersfeld (DE)

(73) Assignee: Siemens Aktiengesellschaft, Munich (DE)

( * ) Notice: Subject to any disclaimer, the term of this patent is extended or adjusted under 35 U.S.C. 154(b) by 919 days.

(21) Appl. No.: 17/046,670

(22) PCT Filed: Mar. 27, 2019

(86) PCT No.: PCT/EP2019/057675
§ 371 (c)(1),
(2) Date: Oct. 9, 2020

(87) PCT Pub. No.: WO2019/197158
PCT Pub. Date: Oct. 17, 2019

(65) Prior Publication Data
US 2021/0036590 A1 Feb. 4, 2021

(30) Foreign Application Priority Data

Apr. 12, 2018 (EP) .................................... 18166920

(51) Int. Cl.
*H02K 15/14* (2006.01)
*B33Y 80/00* (2015.01)
(Continued)

(52) U.S. Cl.
CPC .............. *H02K 15/14* (2013.01); *B33Y 80/00* (2014.12); *H02K 5/18* (2013.01); *H02K 5/20* (2013.01);
(Continued)

(58) Field of Classification Search
CPC .. H02K 5/18; H02K 1/20; H02K 5/04; H02K 9/00; H02K 9/02; H02K 15/14;
(Continued)

(56) References Cited

U.S. PATENT DOCUMENTS 11,031,838 B2 * 6/2021 Huter .................... H02K 5/203
2014/0306559 A1 10/2014 Stillger et al.
2016/0294231 A1 * 10/2016 Andres ................... H02K 5/18

FOREIGN PATENT DOCUMENTS

CN 103843231 A 6/2014
CN 204349705 U 5/2015
(Continued)

OTHER PUBLICATIONS

PCT International Search Report and Written Opinion of International Searching Authority mailed Jun. 18, 2019 corresponding to PCT International Application No. PCT/EP2019/057675 filed Mar. 27, 2019.
(Continued)

*Primary Examiner* — Thiem D Phan
(74) *Attorney, Agent, or Firm* — Henry M. Feiereisen LLC

(57) ABSTRACT

In a method for producing a cooling structure over a surface of a housing of a dynamo-electric rotational machine, at least one material is applied in layers by an additive manufacturing method to the surface of the housing, omitting at least one predefined region. As a result of the application of material, at least two elevations are formed, with a cooling channel being formed between the two elevations.

14 Claims, 5 Drawing Sheets

(51) Int. Cl.
    *H02K 5/18*     (2006.01)
    *H02K 5/20*     (2006.01)
    *H02K 5/24*     (2006.01)
    *B22F 10/00*     (2021.01)
    *B33Y 10/00*     (2015.01)

(52) U.S. Cl.
    CPC ............... *H02K 5/24* (2013.01); *B22F 10/00* (2021.01); *B33Y 10/00* (2014.12); *Y10T 29/49009* (2015.01)

(58) Field of Classification Search
    CPC . H02K 9/06; H02K 5/20; B33Y 10/00; B33Y 80/00; Y10T 29/49009
    USPC ............................ 29/596, 598, 604, 609, 732
    See application file for complete search history.

(56) References Cited

FOREIGN PATENT DOCUMENTS

| CN | 105229902 A | 1/2016 |
|---|---|---|
| DE | 10 2011 108 221 A1 | 1/2013 |
| DE | 10 2015 219 763 A1 | 4/2017 |
| EP | 2 549 629 A2 | 1/2013 |
| JP | 2009165294 A | 7/2009 |

OTHER PUBLICATIONS

Anonymous: "Generatives Fertigungsverfahren—Wikipedia", pp. 1-6, XP056404628. Internet citation—Gefunden Im Internet: URL:https://de.wikipedia.org/w/index.phptitle=Generatives_Fertigungsverfahren&oldid=162809003 [gefunden am Sep. 7, 2017], the whole document, p. 2, line 2, 4th column from below, pp. 3; 2017.

Tong Wei: "5 Motor Frame Design" In: "5 Motor Frame Design", CRC Press, Boca Raten, London, New York, XP055417601, ISBN: 978-1-4200-9143-4 pp. 259-208, DOI: 10.1201/b16863-6, paragraph [5.1.7]; 2014.

Yang, Jiquan et al: "Introduction to 3D Printing Technology" Nanjing Normal University Press, pp. 104-107, May 1, 2016.

Wang, Xibin et al:"Basics of Manufacturing Engineering"; Belling Institute of Technology Press; ISBN: 978-7-5682-6042-9; Jan. 2018.

* cited by examiner ical Application, Serial No. 18166920.1, filed Apr. 12, 2018, pursuant
COOLING-OPTIMISED HOUSING OF A MACHINE

CROSS-REFERENCES TO RELATED APPLICATIONS

This application is the U.S. National Stage of International Application No. PCT/EP2019/057675, filed Mar. 27, 2019, which designated the United States and has been published as international Publication No. WO 2019/197158 A1 and which claims the priority of European Patent Application, Serial No. 18166920.1, filed Apr. 12, 2018, pursuant to 35 U.S.C. 119(a)-(d).

BACKGROUND OF THE INVENTION

The invention relates to a method for producing a cooling structure on a surface of a housing of a dynamoelectric rotary machine.

In air-cooled dynamoelectric rotary machines, in particular electric motors, heat is dissipated over as large a housing surface as possible, in conjunction with an air flow. To this end, housings provided with cooling fins are used.

However, it only becomes economical to produce such housings in large quantities. Additionally, it is not possible to react flexibly to different environmental conditions of a customer during production.

The object underlying the invention is therefore to improve the production.

SUMMARY OF THE INVENTION

The object is achieved in accordance with the invention by a method for producing a cooling structure on a surface of a housing of a dynamoelectric rotary machine, which is designed as a permanently excited synchronous machine with natural cooling using air as the coolant, wherein at least one material is applied to the surface of the housing in layers by means of an additive manufacturing method, while omitting at least one predefined region, preferably a plurality of predefined regions, wherein through the application of material, at least two elevations are formed, wherein through the omission of a predefined region, a cooling channel is formed, wherein the elevations are formed in such a manner that a cooling channel is embodied at least between two elevations.

The object is further achieved in accordance with the invention by a cooling structure on a surface of a housing of a dynamoelectric rotary machine produced by means of the method as set forth above.

Additionally, the object is achieved in accordance with the invention by a housing having a cooling structure as set forth above.

Moreover, the object is achieved in accordance with the invention by a dynamoelectric rotary machine with a housing as set forth above.

The method according to the invention is preferably used to produce a cooling structure on a surface of a housing of a naturally cooled dynamoelectric rotary machine, in particular a motor. It may also, however, be used in machines with self-cooling and forced-cooling, in particular forced-ventilation.

The invention facilitates a heat dissipation by way of convection and/or radiation.

A fluid is preferably used as coolant. Gases, such as air for example, or also liquids, such as water for example, or a water-glycol mixture may be used.

Advantageously, the cooling structure is embodied on the surface of the housing of a servo motor.

The cooling structure preferably causes the surface of the housing to be enlarged, whereby heat can be more effectively and rapidly dissipated. To this end, the coolant flows through the cooling channels and dissipates the heat.

Further advantageous embodiments emerge from the subclaims.

In one advantageous embodiment of the invention, the additive manufacturing method is the MPA method.

This is advantageous for low quantities of dynamoelectric rotary machines in particular.

It is possible to reduce high tool costs, which would be incurred if the housing were die-cast aluminum. It is also possible, however, to modify standard housings manufactured in high quantities by means of the additive manufacturing method. For example, a naturally cooled machine, in particular a servo motor, may be modified in such a way that an efficient forced ventilation is achieved. This creates cost advantages.

In the MPA method (metal powder application method), a main gas, preferably steam, is accelerated in a converging-diverging nozzle. Powder particles are injected just before the converging-diverging point. The powder particles are accelerated to supersonic speed and strike a substrate or a component accordingly. The high kinetic energy of the powder particle is converted to heat on impact, whereby the particle adheres, Since the powder particles are not melted, only a low energy input into the component takes place. In the MPA method, a plurality of nozzles can apply various powder particles at the same time. It is therefore possible to create a component which has at least two different materials.

Other additive manufacturing methods are also possible, however. For example, the additive manufacturing method is a 3D metal printing method (3DMP), an additive arc welding method, a laser cladding method, a plasma powder cladding method, a DMD method (direct metal deposition) or an LMD method (laser metal deposition).

The additive method offers the advantage that it is embodied to proceed in a fully automated manner. This enables a process-reliable method. The additive method additionally offers the advantage that it is possible to manufacture in particular small batches and/or prototypes in a flexible and rapid manner, even while taking into consideration modified geometries.

Aluminum or copper or alloys thereof are preferably used as material for the additive manufacturing.

Copper offers the advantage that it has a high thermal conductivity and therefore can dissipate heat rapidly and effectively. Copper therefore brings advantages if heat has to be conducted over long distances.

Aluminum, however, is cost-efficient. The housing preferably also has aluminum, so that there is no material transition.

In a further advantageous embodiment of the invention, the elevations are formed in such a manner that the elevations extend at least substantially in the direction of a machine axis.

Preferably, the elevations are embodied as fins or cooling fins, which extend at least substantially in the direction of the machine axis. This ensures a rapid dissipation of heat by means of the coolant by way of the cooling channel embodied between two cooling fins.

The elevations may also, however, be embodied as cooling fins which are embodied at an angle between 0° and 180°, preferably between 80° and 100°.

In a further advantageous embodiment of the invention, the elevations are formed in such a manner that the elevations extend from a front axial end of the machine to a rear axial end of the machine.

In a further advantageous embodiment of the invention, the elevations are formed as fins running in parallel with the machine axis.

In a further advantageous embodiment of the invention, elevations are formed as wave-shaped or spiral-shaped fins.

Wave-shaped fins have the advantage that an air flow is swirled along the fins. In this context, a heat transfer to a turbulent air flow is more efficient than a laminar air flow.

Spiral-shaped fins are advantageously formed in the manner of a multi-start thread.

In particular, wave-shaped or spiral-shaped fins cannot be manufactured by way of conventional methods, such as die-casting for example, but this is possible by way of the method according to the invention.

In a further advantageous embodiment of the invention, the elevations are formed as pins, wherein at least two pins are arranged in a row to form a row of pins, preferably at least substantially in the direction of the machine axis.

This brings about a swirling of the air flow, an increasing of the housing surface. At the same time, material is saved in comparison with fins.

In a further advantageous embodiment of the invention, the pins of two opposite rows of pins in relation to a peripheral direction are arranged in an opposing or alternating manner.

In a further advantageous embodiment of the invention, at least one elevation, in particular a fin, having at least one protrusion in the peripheral direction and/or at least one protrusion in the reverse peripheral direction is formed. Advantageously, the reverse peripheral direction is opposed to the peripheral direction.

This embodiment brings an enlargement of the housing surface area, by way of which heat can be optimally emitted.

In a further advantageous embodiment of the invention, the described cooling structure is embodied on a housing. In a further advantageous embodiment of the invention, the housing is surrounded by a hood.

In a further advantageous embodiment of the invention, the hood is manufactured by means of an additive manufacturing method.

Advantageously, the hood is manufactured by means of the additive manufacturing method already mentioned further above.

The invention offers the advantage that, depending on the size of the machine, type of cooling, heat to be dissipated and/or materials used, in particular of the housing, the cooling structure can be adapted optimally.

Furthermore, the invention offers the advantage that heat is guided out of the dynamoelectric rotary machine (in particular from the coil and laminated core) via the elevations, which enlarge the surface of the housing, and out of the machine, and heat is dissipated via the cooling channels through which fluids, in particular air, flow.

The cooling structure may be adapted to customer-specific specifications or environmental conditions in a rapid and favorable manner by means of the method according to the invention.

For example, the elevations may be embodied to be thicker or thinner depending on the field of application. The cooling channels may be embodied to be smooth and non-clogging in dusty fields of application, for example, while in the case of corrosive environmental influences they may be refined.

Furthermore, various materials may be used to embody the elevations. Additionally, material mixtures may be used or material gradients may be realized in the elevations.

Moreover, bypasses for reducing oscillations and noises can be easily realized.

BRIEF DESCRIPTION OF THE DRAWING

The invention is described and explained in more detail below on the basis of the exemplary embodiments shown in the figures, in which.

DETAILED DESCRIPTION OF PREFERRED EMBODIMENTS

Figure 1:
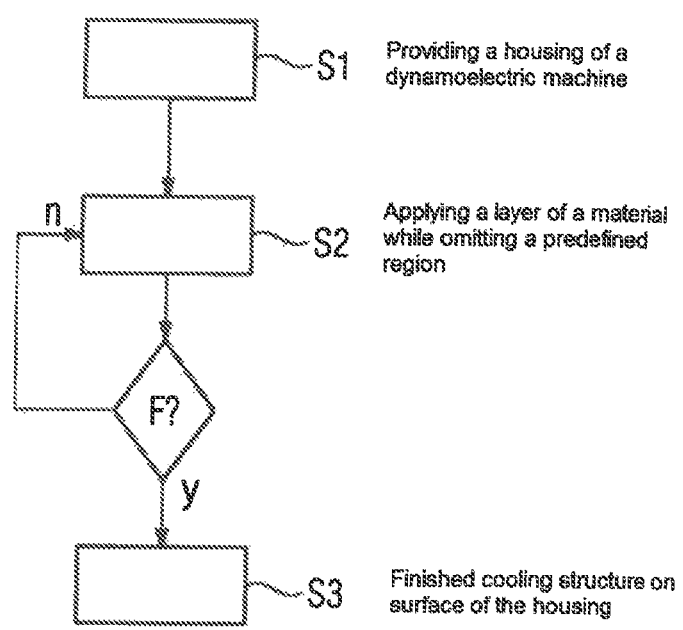
FIG. 1 shows a sequence of a method for producing a cooling structure on a surface of a housing of a dynamoelectric rotary machine.

FIG. 1 shows a sequence of a method for producing a cooling structure on a surface of a housing of a dynamoelectric rotary machine.

In method step S1, a housing of a dynamoelectric rotary machine is provided. In method step S2, a layer of a material, preferably aluminum, is applied while omitting at least one predefined region, preferably a plurality of predefined regions. The formation of elevations is accomplished by applying material in layers, for which reason further layers are preferably applied.

F? denotes the question of whether the elevations have already been formed as desired. If no—denoted with n—then a further layer of the material is applied in method step S2.

If yes—denoted with y—then the cooling structure on the surface of the housing is finished in method step S3. It is not necessary to apply a further material layer.

A further machining of the applied elevations may also take place, e.g. a threaded hole.

Figure 2:
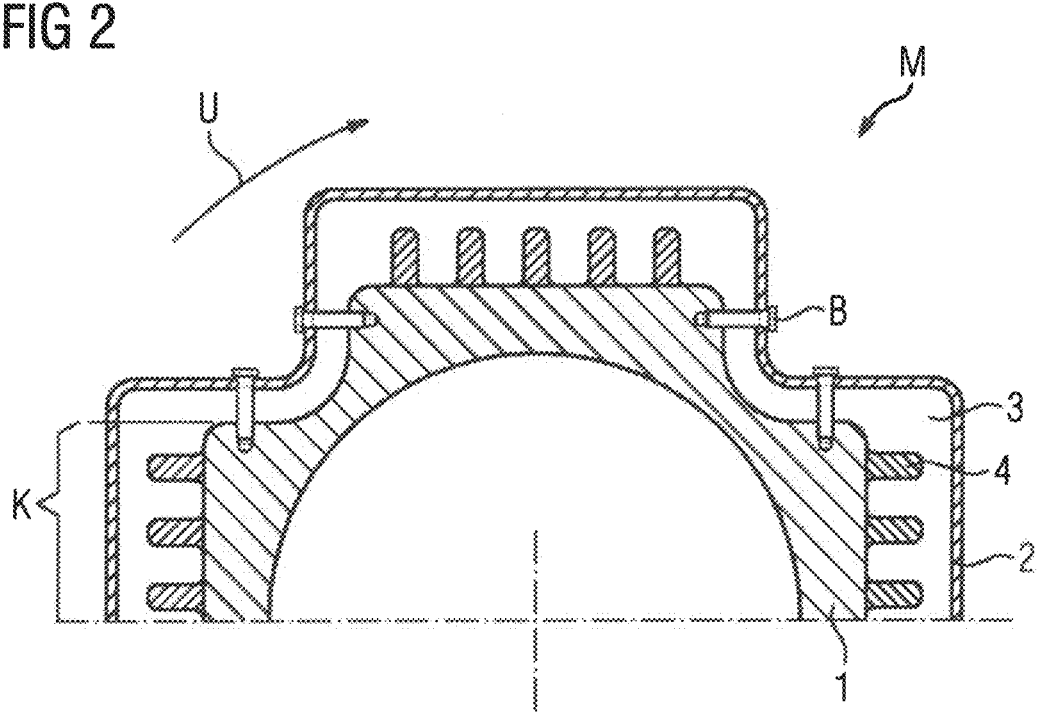
FIG. 2 shows a cross-section through an embodiment of a cross-shaped housing of a dynamoelectric rotary machine with a cooling structure K and a hood.

FIG. 2 shows a cross-section through an embodiment of a cross-shaped housing 1 of a dynamoelectric rotary machine M with a cooling structure K and a hood 2. In the figure, the housing 1 is embodied in a cross-shaped manner. Other housing shapes are also possible, however.

Embodied on the surface of the housing 1 are elevations, which have been formed by means of the additive manufacturing method described in FIG. 1. In the figure, the elevations are embodied as fins 4, which serve to enlarge the surface of the housing 1. Situated between two fins is a cooling channel 3, through which fluids can flow for cooling. Preferably, air flows through the cooling channel 3. The fins 4 are embodied at defined distances along a peripheral direction U.

The fins 4 preferably extend at least substantially in the direction of a machine axis. The fins 4 are preferably designed to be in parallel with a machine axis. The fins 4 preferably extend from a front axial end of the machine M to a rear axial end of the machine M.

The figure additionally shows the hood 2, which is fastened to the housing 1 by means of a fastening means B, e.g. a screw.

Figure 3:
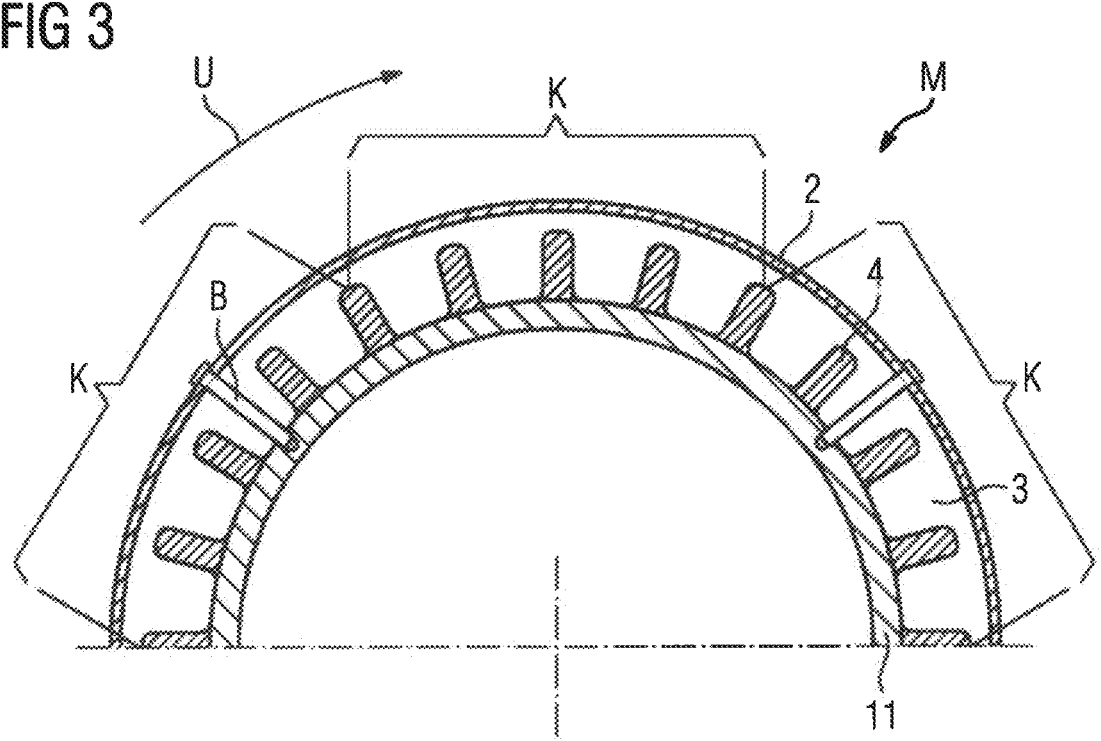
FIG. 3 shows a further cross-section through an embodiment of a circular housing of the dynamoelectric rotary machine with the cooling structure and a hood.

FIG. 3 shows a further cross-section through an embodiment of a circular housing 11 of the dynamoelectric rotary machine M with the cooling structure K and a hood 2. In the figure, unlike in FIG. 2, the housing 11 is embodied in a circular manner.

Figure 4:
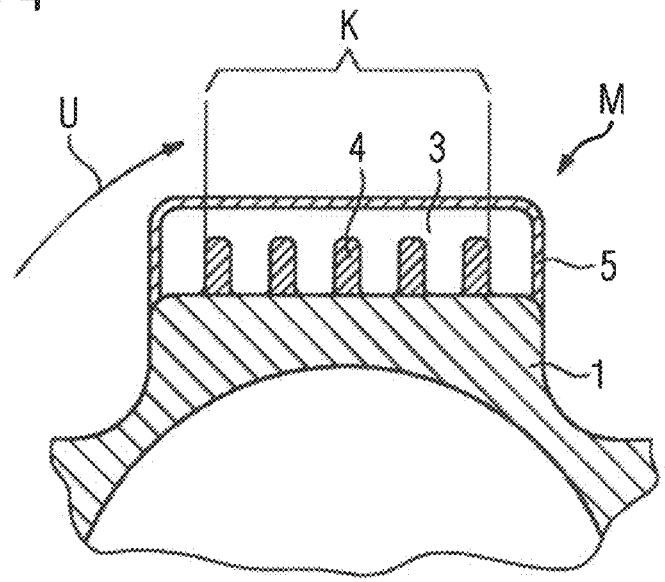
FIG. 4 shows a further cross-section through an embodiment of the cross-shaped housing of the dynamoelectric rotary machine with the cooling structure and an additively manufactured hood.

FIG. 4 shows a further cross-section through an embodiment of the cross-shaped housing 1 of the dynamoelectric rotary machine M with the cooling structure K and an additively manufactured hood 5, The additively manufactured hood 5 offers the advantage that heat can be dissipated more effectively, as it is linked to the housing and therefore heat dissipation is even more efficient. Advantageously, the additively manufactured hood 5 is attached to the surface of the housing in layers during the additive manufacturing method.

Figure 5:
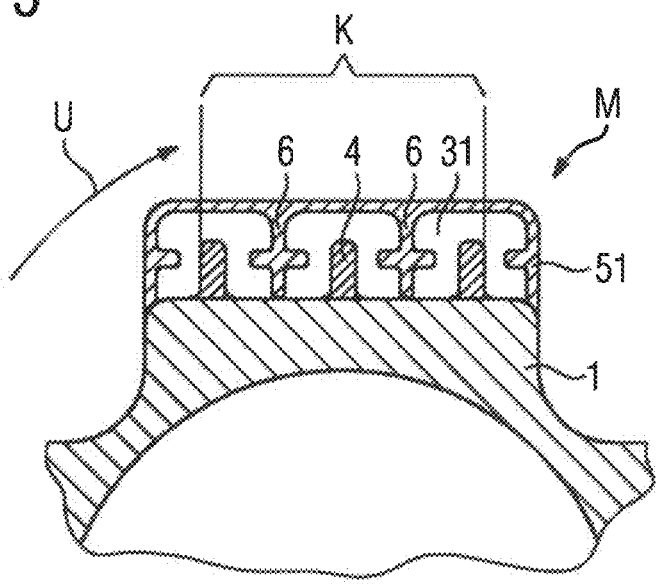
FIG. 5 shows a further cross-section through an embodiment of the cross-shaped housing of the dynamoelectric rotary machine with the cooling structure and an additively manufactured hood (cooling structure comprises fins and T-fins)

FIG. 5 shows a further cross-section through an embodiment of the cross-shaped housing 1 of the dynamoelectric rotary machine M with the cooling structure K and an additively manufactured hood 51, The cooling structure K comprises fins 4 and T-fins 6 (having a protrusion in the peripheral direction U and a protrusion in the reverse peripheral direction).

The T-fin offers an expanded surface enlargement (greater than in the case of pins, for example).

The T-fins 6 are preferably connected to the hood 51 in order to optimize oscillation and noise. This additionally has the advantage that the cooling channels 31 are designed as separate from one another and that various fluids can flow through them for example (e.g. air flows through a first cooling channel and water flows through a second cooling channel), or that fluids can flow through in various directions.

Figure 6:
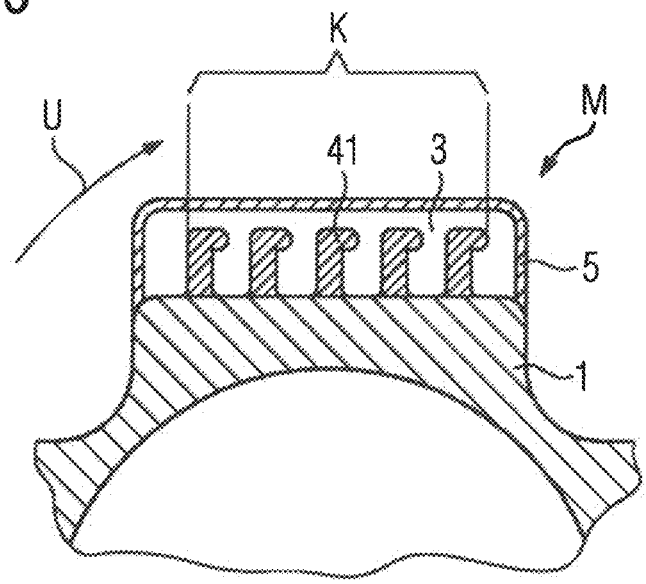
FIG. 6 shows a further cross-section through an embodiment of the cross-shaped housing of the dynamoelectric rotary machine with the cooling structure and an additively manufactured hood (cooling structure comprises L-fins)

FIG. 6 shows a further cross-section through an embodiment of the cross-shaped housing 1 of the dynamoelectric rotary machine M with the cooling structure K and an additively manufactured hood 5. The cooling structure K comprises L-fins 41, which offer an expanded surface enlargement (greater than in the case of normal fins, for example).

The figure additionally shows another design of the hood 5: the hood 5 does not only reach the edge of the housing 1 (see FIG. 4), but rather is embodied along the housing 1.

Figure 7:
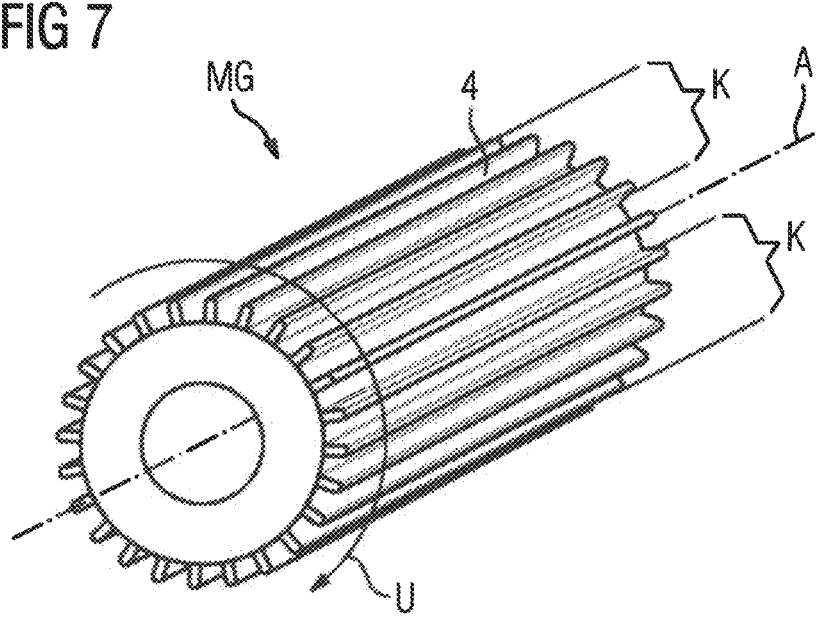
FIG. 7 shows a top view of an embodiment of a dynamoelectric rotary machine with a housing with fins embodied in parallel.

FIG. 7 shows a top view of an embodiment of a dynamoelectric rotary machine with a housing MG with fins 4 embodied in parallel. In the figure, the fins 4 are embodied in parallel with a machine axis A on the surface of the housing from a front axial end up to a rear axial end of the housing, and represent the cooling structure K. However, the fins 4 may also be embodied at an angle to the machine axis A. i.e. beveled.

Figure 8:
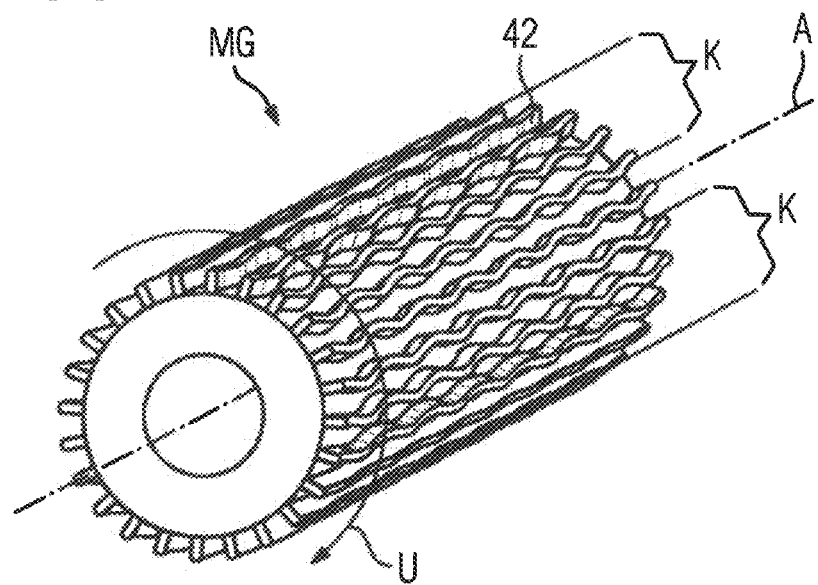
FIG. 8 shows a top view of an embodiment of a dynamoelectric rotary machine with a housing with fins embodied in a wave-shaped manner.

FIG. 8 shows a top view of an embodiment of a dynamoelectric rotary machine with a housing MG with fins 42 embodied in a wave-shaped manner. In the figure, the fins 42 embodied in a wave-shaped manner are embodied in parallel with a machine axis A on the surface of the housing from a front axial end up to a rear axial end of the housing, and represent the cooling structure K. However, the fins 42 embodied in a wave-shaped manner may also be embodied at an angle to the machine axis A, i.e. beveled.

Figure 9:
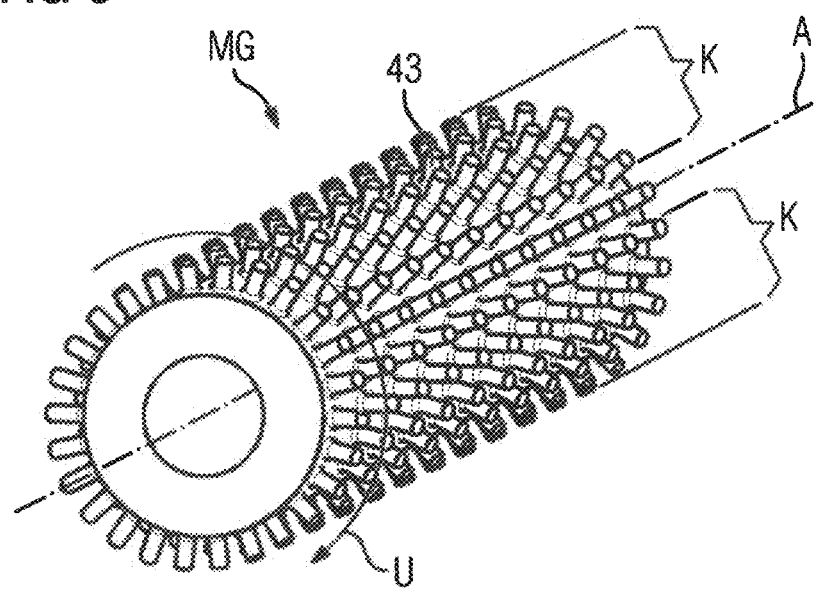
FIG. 9 shows a top view of an embodiment of a dynamoelectric rotary machine with a housing with pins.

FIG. 9 shows a top view of an embodiment of a dynamoelectric rotary machine with a housing MG with pins 43. Advantageously, the pins are embodied along the machine axis A. In the figure, the pins 43 are arranged as standing evenly, but may also be arranged in an alternating manner or in another form. The fins 43 are embodied on the surface of the housing, at least substantially from a front axial end up to a rear axial end of the housing, and represent the cooling structure K.

The pins 43 may have a circular base area (base area is the area on which the pins and the housing are in contact with one another), an oval base area, an elliptical base area, a square base area, a rectangular base area, a square base area with rounded corners or a rectangular base area with rounded corners. Other shapes are also possible, however.

Moreover, it is possible, preferably during the additive manufacturing method, to connect the cooling structure K, which comprises other types of fins (e.g. fins 4, L-fins 41, wave-shapes fins 42) or pins 43, to the respective hood 5 or 51.

The invention claimed is:

1. A method for producing a cooling structure on a surface of a housing of a dynamoelectric rotary machine designed as a permanently excited synchronous machine, said method comprising:
applying a material to the surface of the housing in layers by an additive manufacturing method such as to omit at least one predefined region to thereby form at least two elevations in the shape of pins with substantially identical shapes having a circular base area that are arranged in a row and extend sequentially in a straight line aligned substantially in a direction of a machine axis of the dynamoelectric rotary machine to form a row of pins, and a cooling channel extending between the at least two elevations for passage of air as coolant.

2. The method of claim 1, wherein the material is applied in such a way as to omit a plurality of such predefined region.

3. The method of claim 1, wherein the additive manufacturing method is a MPA (Metal Powder Application) method.

4. The method of claim 1, wherein the elevations are formed in such a manner that the elevations extend from a front axial end of the dynamoelectric rotary machine to a rear axial end of the dynamoelectric rotary machine.

5. The method of claim 1, wherein the pins of two opposite rows of pins in relation to a peripheral direction are arranged in an opposing or alternating manner.

6. The method of claim 1, further comprising forming at least one of the elevations with at least one protrusion in a peripheral direction or with at least one protrusion in a reverse peripheral direction.

7. A cooling structure on a surface of a housing of a dynamoelectric rotary machine, said cooling structure comprising:

at least two elevations in the shape of pins with substantially identical shapes having a circular base area that are arranged in a row and extend sequentially in a straight line aligned substantially in a direction of a machine axis of the dynamoelectric rotary machine to form a row of pins;

a cooling channel extending between the at least two elevations for passage of air as coolant, and a hood surrounding the housing, wherein the hood is manufactured by an additive manufacturing method, wherein the elevations and the cooling channel are produced by applying a material to the surface of the housing in layers by the additive manufacturing method such as to omit at least one predefined region.

8. The cooling structure of claim 7, wherein the material is applied in such a way as to omit a plurality of such predefined region.

9. The cooling structure of claim 7, wherein the additive manufacturing method is a MPA (Metal Powder Application) method.

10. The cooling structure of claim 7, wherein the elevations are formed in such a manner that the elevations extend from a front axial end of the dynamoelectric rotary machine to a rear axial end of the dynamoelectric rotary machine.

11. The cooling structure of claim 7, wherein the pins of two opposite rows of pins in relation to a peripheral direction are arranged in an opposing or alternating manner.

12. The cooling structure of claim 7, wherein at least one of the elevations is formed with at least one protrusion in a peripheral direction or with at least one protrusion in a reverse peripheral direction.

13. A housing, comprising:

a surface;

a cooling structure including at least two elevations in the shape of pins with substantially identical shapes having a circular base area, that are arranged in a row and extend sequentially in a straight line aligned substantially in a direction of a machine axis of dynamoelectric rotary machine to form a row of pins, and a cooling channel extending between the at least two elevations for passage of air as coolant, wherein the elevations and the cooling channel are produced by applying a material to the surface of the housing in layers by an additive manufacturing method such as to omit at least one predefined region, and a hood surrounding the housing, wherein the hood is manufactured by the additive manufacturing method.

14. A dynamoelectric rotary machine, comprising a housing as set forth in claim 13.

* * * * *

UNITED STATES PATENT AND TRADEMARK OFFICE
CERTIFICATE OF CORRECTION

PATENT NO. : 12,057,745 B2  
APPLICATION NO. : 17/046670  
DATED : August 6, 2024  
INVENTOR(S) : Erich Bott, Reiner Seufert and Rolf Vollmer Page 1 of 1

It is certified that error appears in the above-identified patent and that said Letters Patent is hereby corrected as shown below:

On the Title Page

Item (56) Under FOREIGN PATENT DOCUMENTS: replace "CN 204349705" with --CN 204349706--.

Signed and Sealed this  
Twenty-fourth Day of September, 2024

Katherine Kelly Vidal  
*Director of the United States Patent and Trademark Office*